United States Patent [19]

Briggs

[11] 4,313,712
[45] Feb. 2, 1982

[54] MOUNTING OF ROTOR ASSEMBLIES

[75] Inventor: Henry R. Briggs, Bristol, England

[73] Assignee: Rolls-Royce Limited, London, England

[21] Appl. No.: 122,700

[22] Filed: Feb. 19, 1980

[30] Foreign Application Priority Data

Mar. 17, 1979 [GB] United Kingdom ............... 09460/79

[51] Int. Cl.$^3$ .............................................. F01D 5/02
[52] U.S. Cl. .................................. 416/2; 416/170 R; 416/174; 416/204 A
[58] Field of Search .................. 415/9, 170 R, 172 A, 415/174; 416/2, 170 R, 174, 204 A; 64/28 R

[56] References Cited

U.S. PATENT DOCUMENTS 3,395,857  8/1968  Petrie et al. ........................ 416/2 X
4,201,513  5/1980  Sales ......................................... 416/2

Primary Examiner—Leonard E. Smith
Attorney, Agent, or Firm—Stevens, Davis, Miller & Mosher

[57] ABSTRACT

A rotor assembly comprising a drive shaft 13 mounted in a first bearing means 22 at a location spaced from a first end of the shaft 13 and supported at the first end by a support means 23 which is more flexible in bending and in torsion than the drive shaft 13. The support means 23 is mounted for rotation in a second bearing 24 which is co-axial with the first bearing 22. A rotor 10 is connected to the first end of the drive shaft 13 to be driven thereby, and is also supported directly in the second bearing means 24 through a frangible coupling 33. The frangible coupling 33 is designed to break the connection between the rotor 10 and the second bearing means 24 only when the rotor 10 is subjected to a predetermined out-of-balance load to allow the rotor 10 and drive shaft 13 to run inverted.

6 Claims, 3 Drawing Figures

MOUNTING OF ROTOR ASSEMBLIES

This invention relates to the supporting and driving of rotors, and is particularly concerned with supporting and driving rotors of gas turbine engines in such a way that when the mass of the rotor becomes unbalanced inversion of the rotor is permitted.

Imbalance of rotors, such as large compressor fans of gas turbine engines can occur when part, or whole, of a fan blade becomes detached from the fan disc whilst the engine is running. When a blade is lost, the fan rotor experiences a large out-of-balance load which causes it to orbit bodily about its original axis of rotation. After a limited number of revolutions in this essentially unstable condition the rotor inverts, that is to say, it alters its mode of rotation so that its new rotational axis passes through its new centre of gravity and consequently assumes a stabilised rotation.

Inversion only occurs when the rotor is running well above its natural frequency. During normal engine running, the natural frequency of the rotor is designed to be well above the maximum engine speed (typically 30% higher). When a blade comes off it is therefore necessary to lower the natural frequency of the rotor in some way to allow the rotor to invert.

A number of prior proposals for catering for unbalanced running and inversion of fan rotors have been suggested in the past. The first category of such proposals comprises the concept of providing a bearing assembly near to the rotor that is capable of floating, or being permanently deformed, only when unbalance and inversion occurs. Examples of such solutions are to be found in our British Pat. Nos. 1,421,377, 1,418,907 and 1,421,540. With engines having the drive shaft for the rotor mounted in three bearings one can arrange for the bearing nearest to the rotor to float or become permanently deformed whilst also allowing the second nearest bearing to move to accommodate whirling of the drive shaft. However, in some engines, and in particular, in those designs in which the rotor drive shaft is supported in only two bearings (as opposed to the usual three), it is impossible to allow the bearing nearest to the rotor to float or become permanently deformed.

A second category of prior proposals recognises the need to mount the rotor drive shaft in bearings that are relatively immovable in a radial direction and which are designed only to cope with the usual loads experienced during normal balanced engine running. This is particularly desirable where the rotor or fan drive shaft is only supported in two bearings. This latter category of proposals usually disconnect the drive from the drive shaft to the rotor when imbalance occurs by breaking a frangible coupling in the drive path to the rotor. The rotor is then supported by structure that is relatively more flexible in transverse directions than the drive shaft. Usually a secondary drive path is provided to drive the rotor when the primary drive path is broken. British Pat. No. 1,458,532 relates to such a proposal where the primary torsional drive path is through a frangible coupling and a secondary drive path which by-passes the coupling is provided.

A further proposal falling in the latter category is described in British Pat. No. 1,556,266. Here again in this design, the primary drive is taken through a frangible coupling and the rotor is supported on flexible structure as before. In this case the secondary drive path is through a torsionally stiff auxiliary shaft.

In both proposals described in British Pat. Nos. 1,458,532 and 1,556,266 the primary drive to the rotor is through a frangible coupling that must be robust enough to withstand torsional stresses during normal balanced running but be weak enough to break when subjected to a predetermined value of transverse load when the rotor becomes unbalanced. It is difficult to design a coupling to meet both criteria.

An object of the present invention is to provide supporting and driving structure for rotors, particularly for gas turbine engines, wherein the main torsional drive to the rotor during normal and inverted running is transmitted through a common path which does not include a frangible coupling in the drive path.

According to the present invention there is provided a rotor assembly comprising, a drive shaft mounted in a first bearing means at a location spaced from a first end of the shaft, and supported at the first end by a support means which is more flexible in bending and in torsion than the drive shaft, the support means being mounted for rotation in a second bearing means co-axial with the first bearing means, a rotor connected to the first end of the drive shaft to be driven thereby, the rotor being supported directly in the second bearing means through a frangible coupling designed to break the connection between the rotor and the second bearing means only when the rotor is subjected to a predetermined out-of-balance load to allow the rotor and drive shaft to run inverted.

The support means preferably comprises a cylindrical array of longitudinally extending members effectively connected at one end to the second bearing means so as to be rotatable therewith and effectively connected at their outer ends to the said first end of the drive shaft. A convenient way of forming this cylindrical array of members comprises the provision of a hollow cylindrical shaft which has longitudinally extending slots machined in its wall thereby to define the members.

Preferably the first bearing means comprises a single thrust bearing. Alternatively the first bearing means may comprise two bearings provided that the two bearings allow the drive shaft and rotor to invert. Although, it should be borne in mind that there does not appear to be any great advantage in using more than one bearing in the first bearing means.

It is preferred to locate the first bearing means at, or closely adjacent to, the second end of the shaft. However, if desired the first bearing means may be located intermediate the ends of the shaft and a third bearing means may be provided at a location between the first bearing means and the second end of the shaft for directly supporting the shaft, providing that the third bearing means and its location relative to the first and second bearing means is designed so as to allow the inversion of the shaft and rotor. A suitable mounting for the first and third bearing means which would allow the bearings to align with the shaft is disclosed in British Pat. No. 1,318,629.

The second bearing means may comprise a single thrust bearing, or two bearings to provide restraint against bending moments.

The bearings may comprise ball races or roller races and may be of the squeeze film or hydrodynamic type.

The frangible coupling preferably comprises a plurality of shear pins or bolts for securing the rotor to a part of the support means. The shear pins are designed to fracture when radially directed loads due to imbalance of the rotor exceed a predetermined value.

An embodiment of the invention will now be described, by way of an example, with reference to the accompanying drawings, in which.

Figure 1:
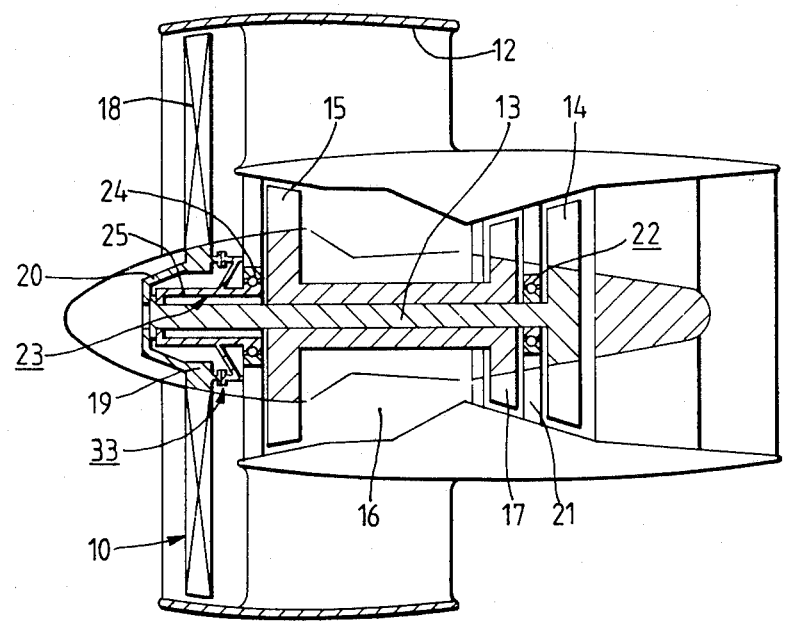
FIG. 1 shows a diagrammatic view of a ducted fan gas turbine aero-engine showing structure for supporting and driving the front fan constructed in accordance with the present invention.
Figure 3:
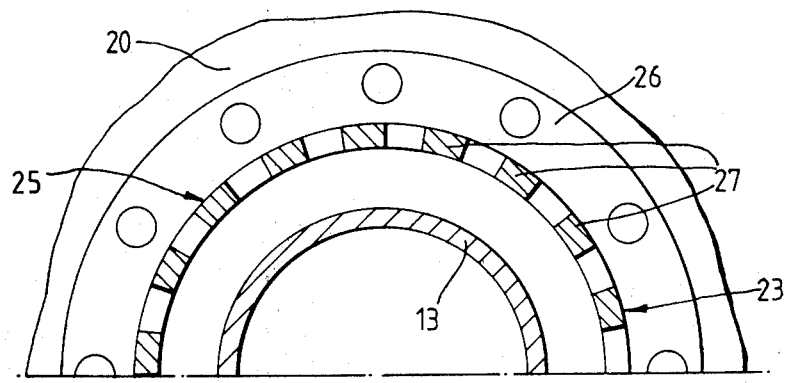
FIG. 3 is a part sectional view taken along the line A—A of FIG. 2.

Referring now to the drawings, there is shown in FIG. 1, a ducted fan engine having a front fan rotor 10 mounted for rotation in a duct 12. The fan is mounted on a drive shaft 13 driven by a turbine 14 which is itself driven by an efflux of gases from a gas generator. The gas generator is of any conventional type and includes one or more further compressors 15, combustion equipment 16, and turbines 17, and the efflux of gases from the gas generator is discharged through an exhaust nozzle.

Figure 2:
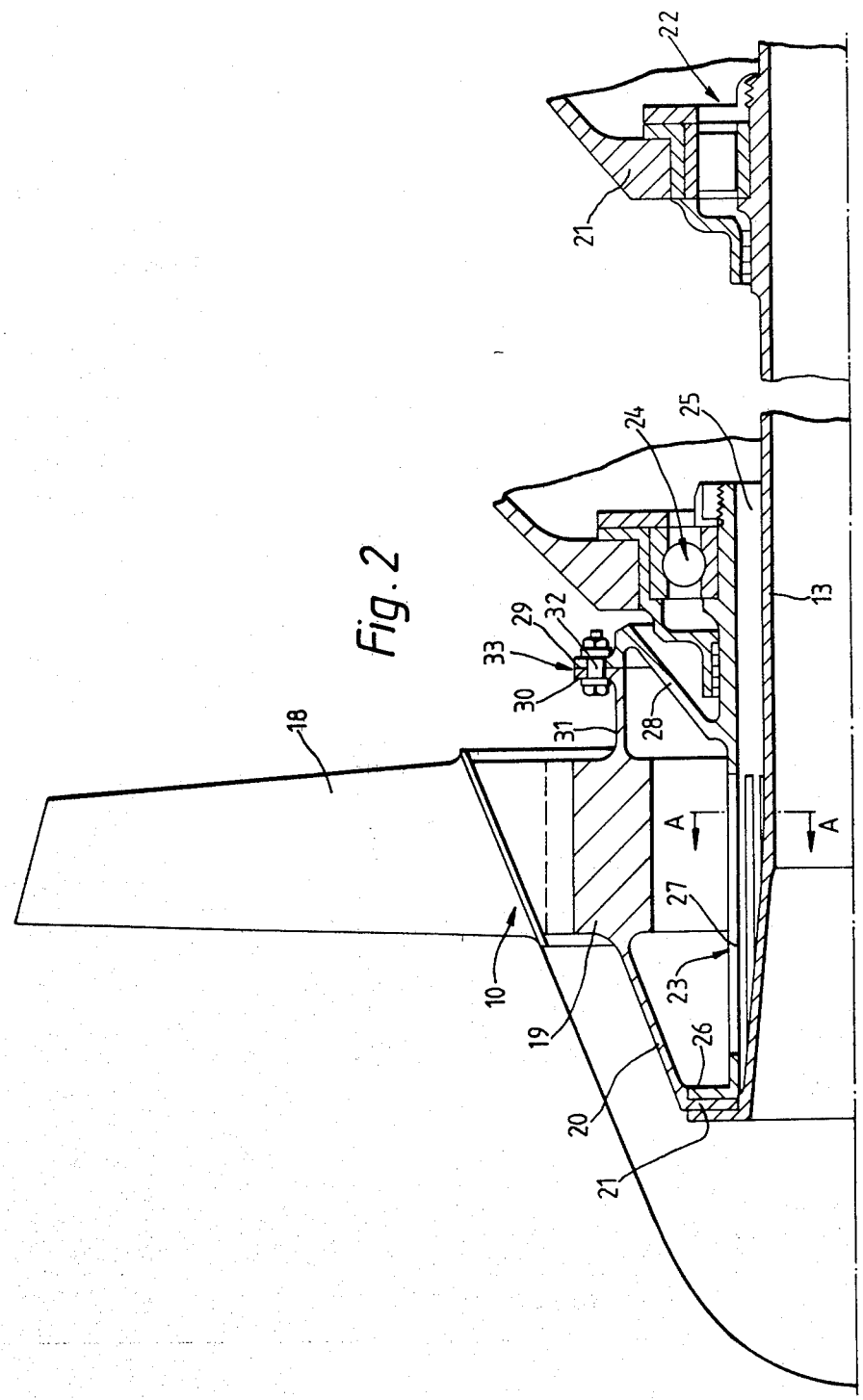
FIG. 2 illustrates in greater detail the front fan assembly of the engine shown in FIG. 1 and is a half sectional view of part of the engine.

Referring now to FIG. 2, the fan rotor 10 comprises a plurality of fan blades 18 secured by conventional blade fixing methods to the perimeter of the rotor disc 19. The rotor disc 19 is provided with an integral drive cone 20 having a flange 21 for securing the rotor disc 19 to the drive shaft 13.

The drive shaft 13 is mounted at the rearmost end in a bearing means 22 carried by fixed structure (guide vanes) of the engine casing. The bearing means 22 comprises a single conventional roller bearing. The turbine 14 (not shown in FIG. 2) is secured to the shaft 13 in a well known manner ahead of, or to the rear of, the bearing 22. The drive shaft 13 is supported at its other end by a support means 23 which in turn is mounted in its own thrust bearing 24, which is co-axial with the bearing 22.

The support means 23 comprises a hollow cylindrical shaft 25 located concentrically over the drive shaft 13. The shaft 25 has a flange 26 which co-operates with the flange 21 and the flange 21 is bolted to a flange on the front end of drive shaft 13 by bolts (not shown). The shaft 25 has a plurality of equispaced uniform width slots machined along part of its length between the bearing 24 and the flange 21 so as to define between the slots a cylindrical array of longitudinal members or rods 27. This slotted portion of the support means 23 is therefore more flexible in bending and in torsion than the drive shaft. The cylindrical array of members or rods 27 can be likened to a so called "squirrel cage".

The support means 23 is provided with an integral rear cone 28 which terminates in a flange 29 that co-operates with a flange 30 provided on a rearwardly extending hollow extension 31 of the rotor disc 19. The flanges 29 and 30 are clamped together by shear pins 32 thereby forming a frangible coupling 33. The fan rotor 10 is thereby effectively supported directly in the bearing 24 until the shear pins 32 fail. The frangible coupling 33 is designed to break the connection between the fan rotor 10 and the bearing 24 only when the fan rotor 10 is subjected to a predetermined out-of-balance load, for example, as would happen if part or whole of a blade is lost. When the coupling 33 fails, the fan rotor 10 and the end of the drive shaft 13 which is connected to the rotor and the support means 23 is free to orbit about the centre line axis of shaft 13 and the shaft 13 is then effectively constrained directly by the rear bearing 22 and indirectly through the support means 23 by the bearing 24. After a limited number of revolutions the fan rotor 10 and the shaft 13 inverts and assumes a stabilised rotation about a new axis given suitable damping.

After inversion, the fan assembly will orbit around its new mass centre and since this will be on, or near, the engine centre-line, the large out-of-balance loads will largely disappear or be greatly reduced. Suitable damping could be achieved, for example, by allowing the fan blades to machine out an abradable material in the fan casing during the initial orbit of the fan assembly after unbalance occurs. The labyrinth seals at the bearings 22 and 24 remain largely undisturbed when the fan assembly inverts thus allowing continuous running, and gyro-stiffening of the shaft by the fan assembly will be retained at all times. Further more, the rods 27 of the support means 23 are not subjected to any cyclic loading. After inversion, the support means 23 simply bends in a radial direction and retains the kinked shape.

Although the aforementioned embodiment is concerned with mounting a front fan of a gas turbine engine, the invention may have application for other rotors in other rotating machinery and in particular for other compressors in gas turbine engines, and in turbine generators.

I claim:

1. A rotor assembly comprising, a drive shaft mounted in a first bearing means at a location spaced from a first end of the shaft, and supported at the first end by a support means which is more flexible in bending and in torsion than the drive shaft, the support means being mounted for rotation in a second bearing means co-axial with the first bearing means, a rotor connected to the first end of the drive shaft to be driven thereby, the rotor being supported in the second bearing means through a frangible coupling designed to break the connection between the rotor and the second bearing means only when the rotor is subjected to a predetermined out-of-balance load to allow the rotor and drive shaft to run inverted, and the rotor is connected to a first part of the frangible coupling and a second part of the frangible coupling is supported for rotation in the second bearing means.

2. A rotor assembly according to claim 1 wherein the support means comprises a cylindrical array of longitudinally extending members effectively connected at one end to the second bearing means so as to be rotatable therewith and effectively connected at their other ends to the said first end of the drive shaft.

3. A rotor assembly according to claim 2 wherein the support means comprises a hollow cylindrical shaft which has longitudinally extending slots machined in its wall thereby to define the members.

4. A rotor assembly according to claim 1 wherein the second bearing means comprises a single thrust bearing.

5. A rotor assembly according to claim 1 wherein the first bearing means is provided at, or adjacent to a second end of the shaft.

6. A rotor assembly according to claim 1 wherein the frangible coupling comprises a plurality of shear pins for securing the rotor to a part of the support means, and the shear pins are designed to fracture when radially directed loads due to imbalance of the rotor exceed a predetermined value.

* * * * *